US008534507B2

(12) United States Patent
Gronholm

(10) Patent No.: US 8,534,507 B2
(45) Date of Patent: Sep. 17, 2013

(54) GRANULE DISPENSERS

(76) Inventor: Mike Gronholm, Milwaukie, OR (US)

(*) Notice: Subject to any disclaimer, the term of this patent is extended or adjusted under 35 U.S.C. 154(b) by 150 days.

(21) Appl. No.: 13/105,864

(22) Filed: May 11, 2011

(65) Prior Publication Data

US 2012/0285997 A1 Nov. 15, 2012

(51) Int. Cl.
G01F 11/10 (2006.01)
(52) U.S. Cl.
USPC ..... 222/368; 222/108; 222/181.1; 222/185.1; 222/189.06; 141/369
(58) Field of Classification Search
USPC ................. 222/367–368, 370, 363, 444, 452, 222/108, 185.1, 355, 189.06, 181.1; 141/267–268, 369–370
See application file for complete search history.

(56) References Cited

U.S. PATENT DOCUMENTS

| 241,307 | A | * | 5/1881 | Corwin | 222/145.7 |
|---|---|---|---|---|---|
| 1,524,585 | A | * | 1/1925 | Shutterly | 222/236 |
| 1,772,377 | A | * | 8/1930 | Whittle | 222/148 |
| 1,861,734 | A | * | 6/1932 | Bergmann | 141/286 |
| 2,077,980 | A | * | 4/1937 | Bell | 141/369 |
| 2,116,300 | A | * | 5/1938 | Campos | 141/369 |
| 2,259,710 | A | * | 10/1941 | Stern | 222/41 |
| 3,204,833 | A | * | 9/1965 | Weitzner | 222/355 |
| 3,735,899 | A | * | 5/1973 | Rollinson | 222/135 |
| 4,151,933 | A | * | 5/1979 | Myers | 222/288 |
| 4,162,751 | A | * | 7/1979 | Hetland et al. | 222/293 |
| 4,569,463 | A | * | 2/1986 | Pellegrino | 222/288 |
| 4,650,098 | A | * | 3/1987 | Ellis et al. | 222/252 |
| 4,867,351 | A | * | 9/1989 | Grune et al. | 222/307 |
| 5,123,572 | A | * | 6/1992 | Ford | 222/135 |
| 5,244,019 | A | * | 9/1993 | Derby | 141/65 |
| 5,285,705 | A | * | 2/1994 | Buttle et al. | 99/280 |
| 5,292,037 | A | * | 3/1994 | Held | 222/339 |
| 5,437,393 | A | * | 8/1995 | Blicher et al. | 222/77 |
| 5,833,097 | A | * | 11/1998 | Ruth | 222/368 |
| 5,927,558 | A | * | 7/1999 | Bruce | 222/185.1 |
| 6,112,942 | A | * | 9/2000 | Deacon | 221/266 |
| 6,431,407 | B1 | * | 8/2002 | Hogan et al. | 222/278 |
| 6,766,924 | B1 | * | 7/2004 | Ophardt et al. | 222/368 |
| 6,871,762 | B1 | * | 3/2005 | Cripps | 222/142.3 |
| 6,951,294 | B1 | * | 10/2005 | Laberinto | 222/142 |
| 7,237,699 | B2 | * | 7/2007 | Zill et al. | 222/636 |
| 8,002,153 | B2 | * | 8/2011 | Lowther | 222/361 |
| 2011/0101023 | A1 | * | 5/2011 | Chan et al. | 222/1 |
| 2012/0267401 | A1 | * | 10/2012 | Schroedter | 222/368 |

* cited by examiner

Primary Examiner — Frederick C Nicolas
(74) Attorney, Agent, or Firm — Mohr Intellectual Property Law Solutions, PC

(57) ABSTRACT

A granule dispenser for dispensing granules into a receiving cup, the granule dispenser including a dispenser and a base. The dispenser includes a collector rotatably mounted to the dispenser and configured to receive a predetermined volume of granules. The collector defines a cavity defining a dispensing volume and a port providing access to the cavity. The base supports the dispenser from underneath the dispenser and includes a chute, a support, and a catch plate. The support is configured to releasably mount the receiving cup beneath the chute in a position to receive granules from the chute. The catch plate is spaced beneath the support in a position below the receiving cup when the receiving cup is mounted to the support to catch granules that are not transferred to the receiving cup. In some examples, the collector rotates between a receiving position where the port is positioned to receive granules and a dispensing position where the port is positioned above the chute. In some further examples, the granule dispenser includes a hopper to store granules.

20 Claims, 8 Drawing Sheets

GRANULE DISPENSERS

BACKGROUND

The present disclosure relates generally to granule dispensers. In particular, granule dispensers for beverage granules, such as coffee, tea, and hot cocoa, are described herein.

Coffee, tea, and hot cocoa, are staple beverages in many cultures. Coffee is typically brewed by passing hot water over ground, roasted coffee beans. Tea is typically made by steeping ground tea leaves in hot water. Hot cocoa may be made by mixing cocoa powder with hot water. Ground coffee beans, ground tea leaves, and cocoa powder may be described as granules or beverage granules.

Machines designed to prepare a single serving of coffee, tea, hot cocoa, and other beverages have become popular. These machines make a single serving of a beverage by mixing hot water with granules of coffee, tea, or hot cocoa supplied to the machine, filtering the brewed beverage from the spent granules, and dispensing the brewed beverage into a beverage cup to be consumed by the user. A user can easily create a variety of beverages by simply changing the type, style, or brand of granule supplied to the machine. For example, a user may supply French roast coffee granules to the machine in the morning to make French roast coffee, supply hazelnut coffee granules to the machine in the afternoon to make hazelnut coffee, and supply green tea granules to the machine in the evening to make green tea.

Currently, a user often purchases a prepackaged, single serving, disposable container of granules to use with the machines. These disposable containers are typically made of plastic and are relatively expensive for the quantity of granules provided as compared to equivalent granules sold in multi-serving containers. Indeed, the expense per serving of the prepackaged, single use containers can be 10 times more expensive.

Further, the disposable nature of the prepackaged, single serving granule containers creates adverse environmental impacts. Similar to the problems associated with plastic water bottles, widespread use and subsequent disposal of the prepackaged, single serving granule containers adds significant quantities of avoidable refuse to landfills. Moreover, plastic containers are petroleum products with the attendant problems associated with petroleum being a limited resource and petroleum production contributing to greenhouse gas emissions.

As an alternative to prepackaged, disposable, single serving containers, reusable containers can be filled with granules by the user. However, this approach often creates a mess when the user attempts to transfer granules from a larger container to the single serving container. In particular, the size of single serving containers are typically small and transferring granules into the container with a scoop creates spills and overflow onto the counter.

Users find it difficult to reliably and accurately transfer the correct amount of granules to use in the single serving machine absent prepackaged granule containers. Transferring too many granules creates an undesirably strong beverage and transferring too few granules creates an undesirably weak beverage. Known methods do not allow for automatically dispensing a given quantity of granules into a reusable, single serving container.

In addition to being messy and imprecise, manually transferring granules to a reusable container by known methods is slow. Conventional processes are slow, in part, because the user must get everything ready each time a single serving of a beverage is desired. Indeed, known methods do not allow for staging of multiple servings of granules to be dispensed as needed, if more accurate quantities are desired, the known, manual techniques slow even more.

Thus, there exists a need for granule dispensers that improve upon and advance the design of known granule dispensers. Examples of new and useful granule dispensers relevant to the needs existing in the field are discussed below.

SUMMARY

The present disclosure is directed to granule dispensers for dispensing granules into a receiving cup, the granule dispenser including a dispenser and a base. The dispenser includes a collector rotatably mounted to the dispenser and configured to receive a predetermined volume of granules. The collector defines a cavity defining a dispensing volume and a port providing access to the cavity. The base supports the dispenser from underneath the dispenser and includes a chute, a support, and a catch plate. The support is configured to releasably mount the receiving cup beneath the chute in a position to receive granules from the chute. The catch plate is spaced beneath the support in a position below the receiving cup when the receiving cup is mounted to the support to catch granules that are not transferred to the receiving cup. In some examples, the collector rotates between a receiving position where the port is positioned to receive granules and a dispensing position where the port is positioned above the chute. In some further examples, the granule dispenser includes a hopper to store granules.

DETAILED DESCRIPTION

The disclosed granule dispensers will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various granule dispensers are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
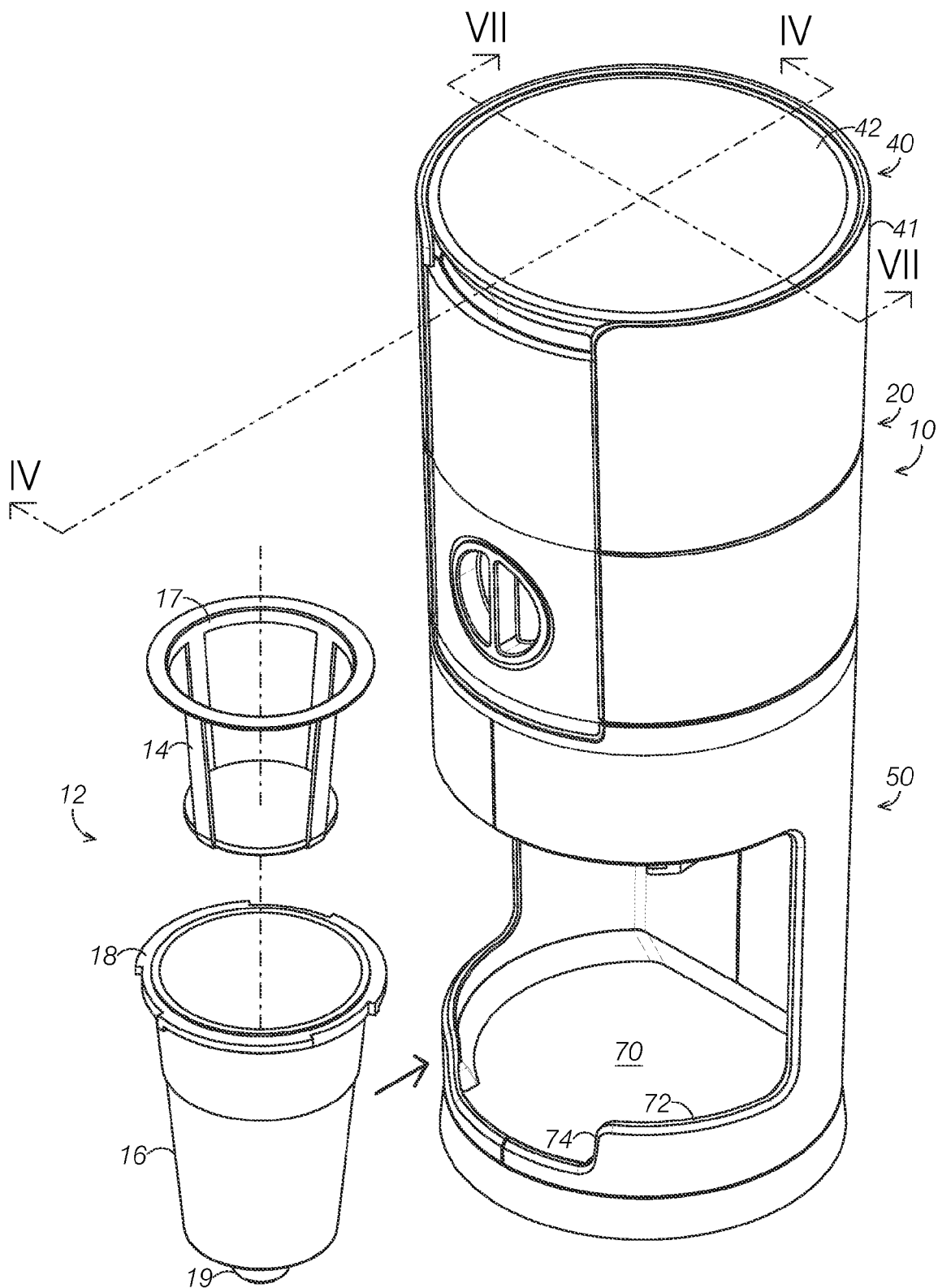
FIG. 1 is a perspective view of a granule dispenser and a receiving cup suitable for use with the granule dispenser.
Figure 2:
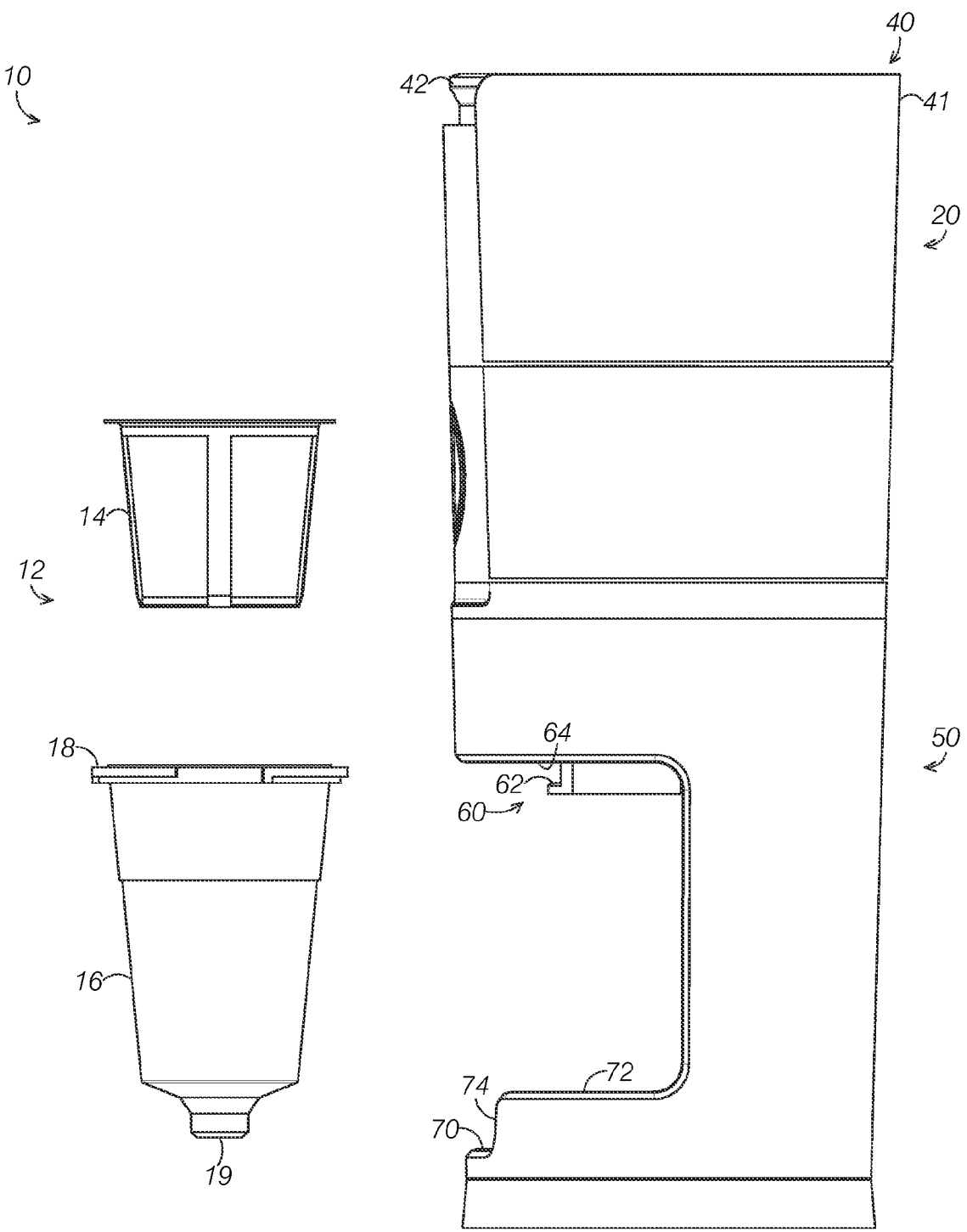
FIG. 2 is a side elevation view of the granule dispenser shown in FIG. 1 with the receiving cup adjacent to the granule dispenser.
Figure 3:
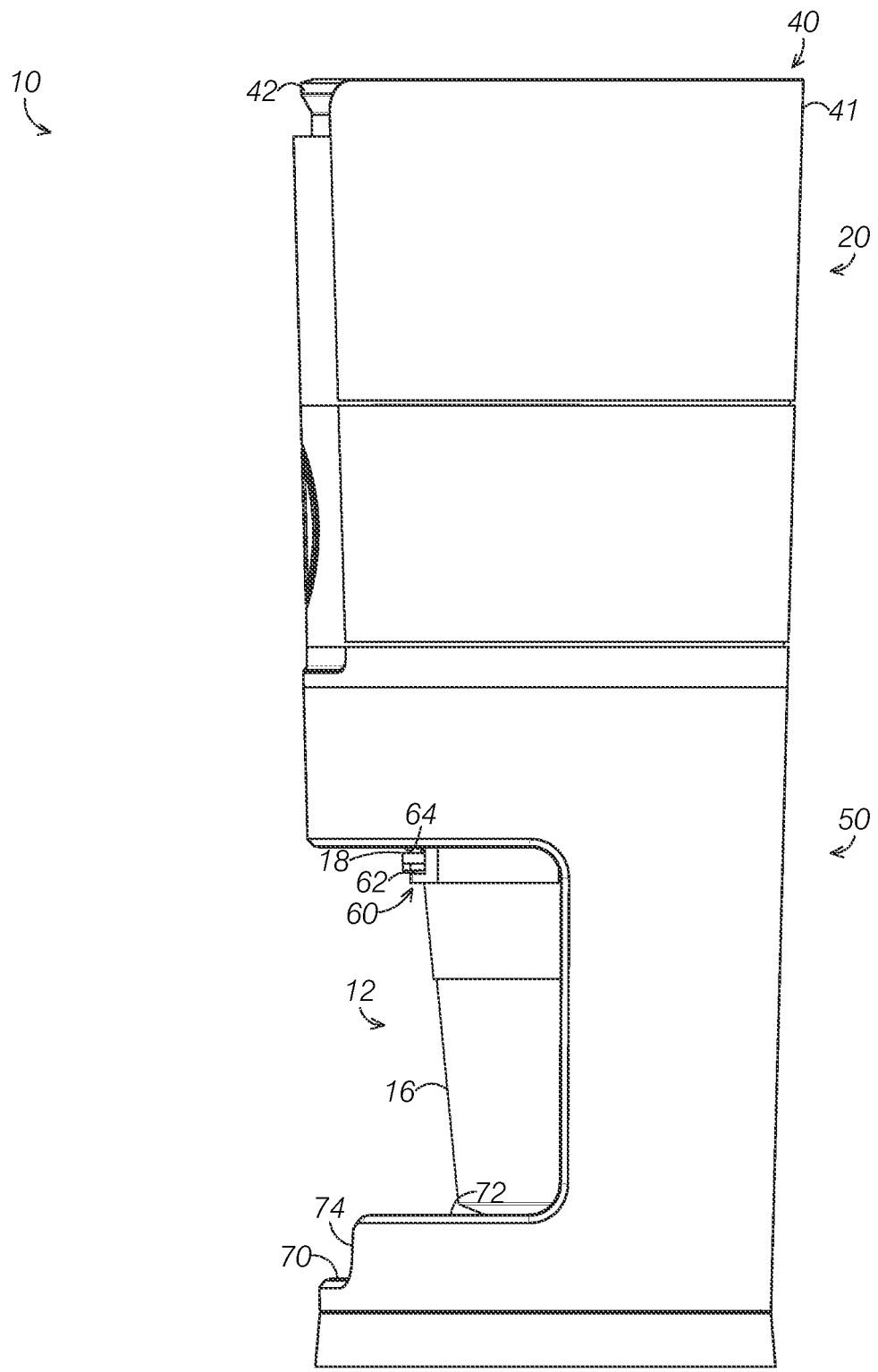
FIG. 3 is a side elevation view of the granule dispenser shown in FIG. 1 with the receiving up mounted on the granule dispenser.

With reference to FIGS. 1-8, a granule dispenser 10 will now be described. As shown in FIG. 1, granule dispenser 10 includes a dispenser 20, a base 50, and a catch plate 70. As will be explained in more detail below, granule dispenser 10 is configured to store and dispense granules into a receiving cup 12. In the example shown in FIGS. 1-8, granule dispenser 10 is configured to dispense a predetermined volume of granules into receive cup 12. In some examples, the dispenser and the base are configured to selectively detach from one another.

As used herein, "predetermined volume" means an approximate volume of granules corresponding to a volume needed or used in a corresponding application. For example, predetermined volume may mean a single serving of granules for a brewing process. In other examples, predetermined volume means a cup, teaspoon, or other volume commonly used in cooking applications. Predetermined volume may mean a precisely measured volume or an approximate volume.

A wide variety of granules may be stored and dispensed by granule dispenser 10. For example, granules appropriate for use with granule dispenser 10 include beverages granules, such as coffee, tea, hot cocoa, and apple juice. Such beverage granules are sometimes referred to as powders, mixes, or "instant" formulations. Other granules suitable to be dispensed with granule dispenser 10 include salt, sugar, ground pepper, flour, and spices. As used herein, granules should be understood to include any solid material with a relatively small particle size, whether edible or not.

Granule dispenser 10 may find application when used in conjunction with machines designed to prepare or brew beverages by mixing water with a volume of granules. In particular, granule dispenser 10 may complement machines designed to brew a single serving of a beverage from a predetermined volume of granules. Of course, granule dispensers described herein may be adapted for a wide variety of uses beyond machines designed to brew beverages, such as in cooking or baking applications where volumes of granules, such as salt or sugar, are used.

In the example shown in FIG. 1, receiving cup 12 is configured for use in single serving beverage brewing machines. Receiving cup includes a filter frame 14 and a brewing cup 16. Brewing cup 16 includes an outer lip 18 and an outlet port 19. Filter frame 14 mounts inside brewing cup 16 and defines a top opening 17 as depicted in FIG. 5.

Filter frame 14 receives and supports a beverage filter (not pictured). Granule dispenser 10 dispenses a volume of granules into the beverage filter and the beverage filter holds the granules separate from brewing cup 16. When receiving cup 12 is mounted to a single serving beverage brewing machine, the brewing machine passes hot water over the granules held in the beverage filter to dissolve or extract flavor components from the granules in a brewing process. The brewed liquid eventually passes through the beverage filter into brewing cup 16 to thereafter be transferred through outlet port 19 to a user's beverage container of choice.

Figure 4:
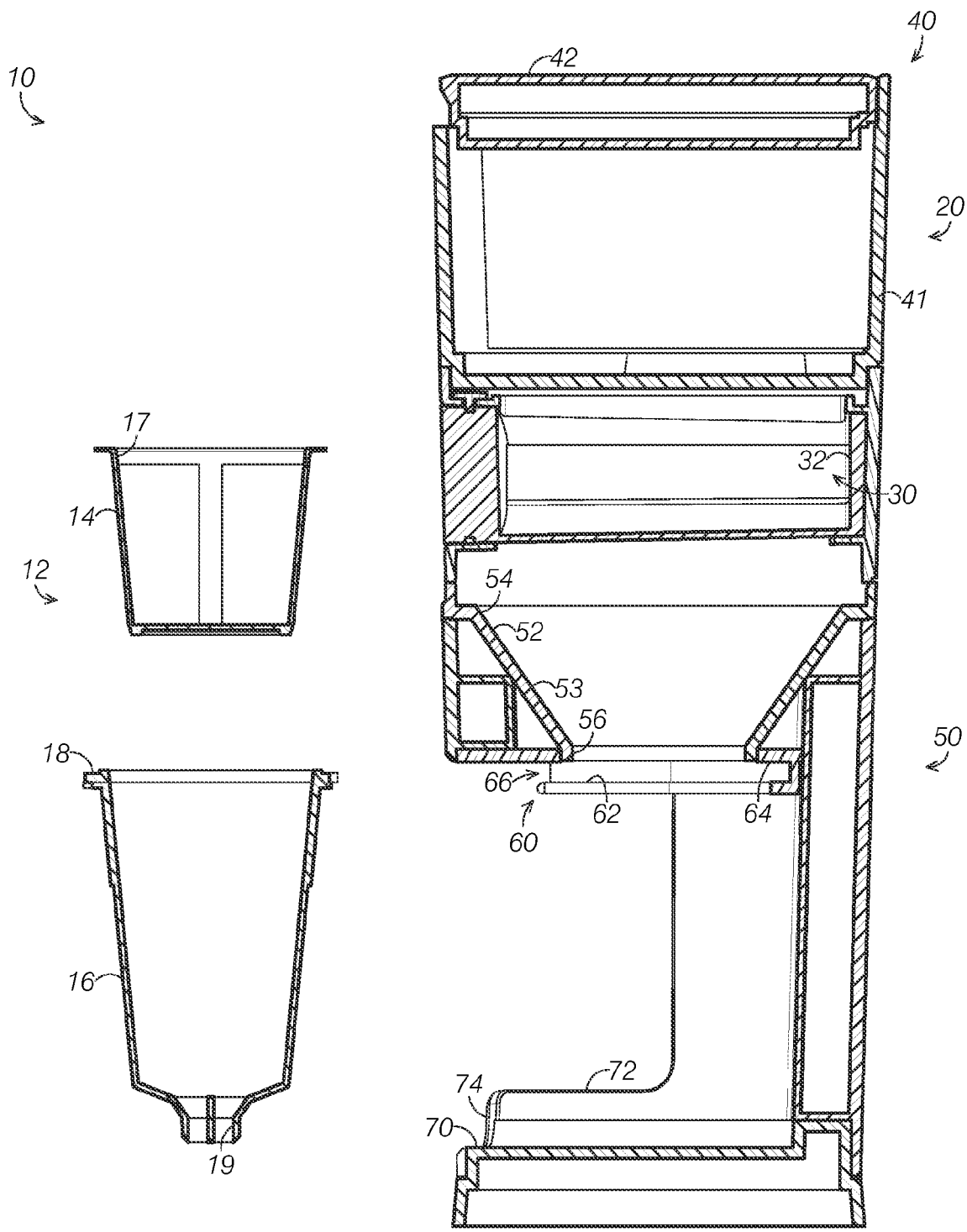
FIG. 4 is a side elevation view of a cross section of the granule dispenser shown in FIG. 1 taken about the line IV-IV in FIG. 1 with the receiving cup adjacent to the granule dispenser.
Figure 5:
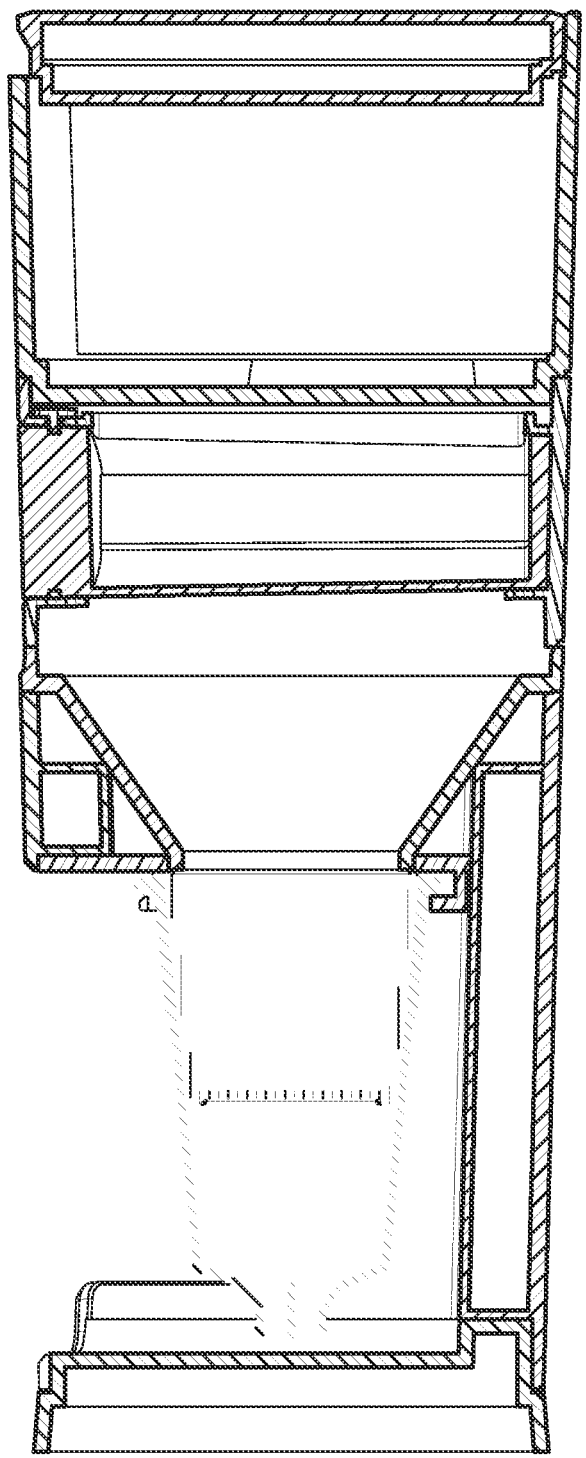
FIG. 5 is a side elevation view of a cross section of the granule dispenser shown in FIG. 1 taken about the line IV-IV in FIG. 1 with the receiving cup mounted on the granule dispenser.
Figure 7:
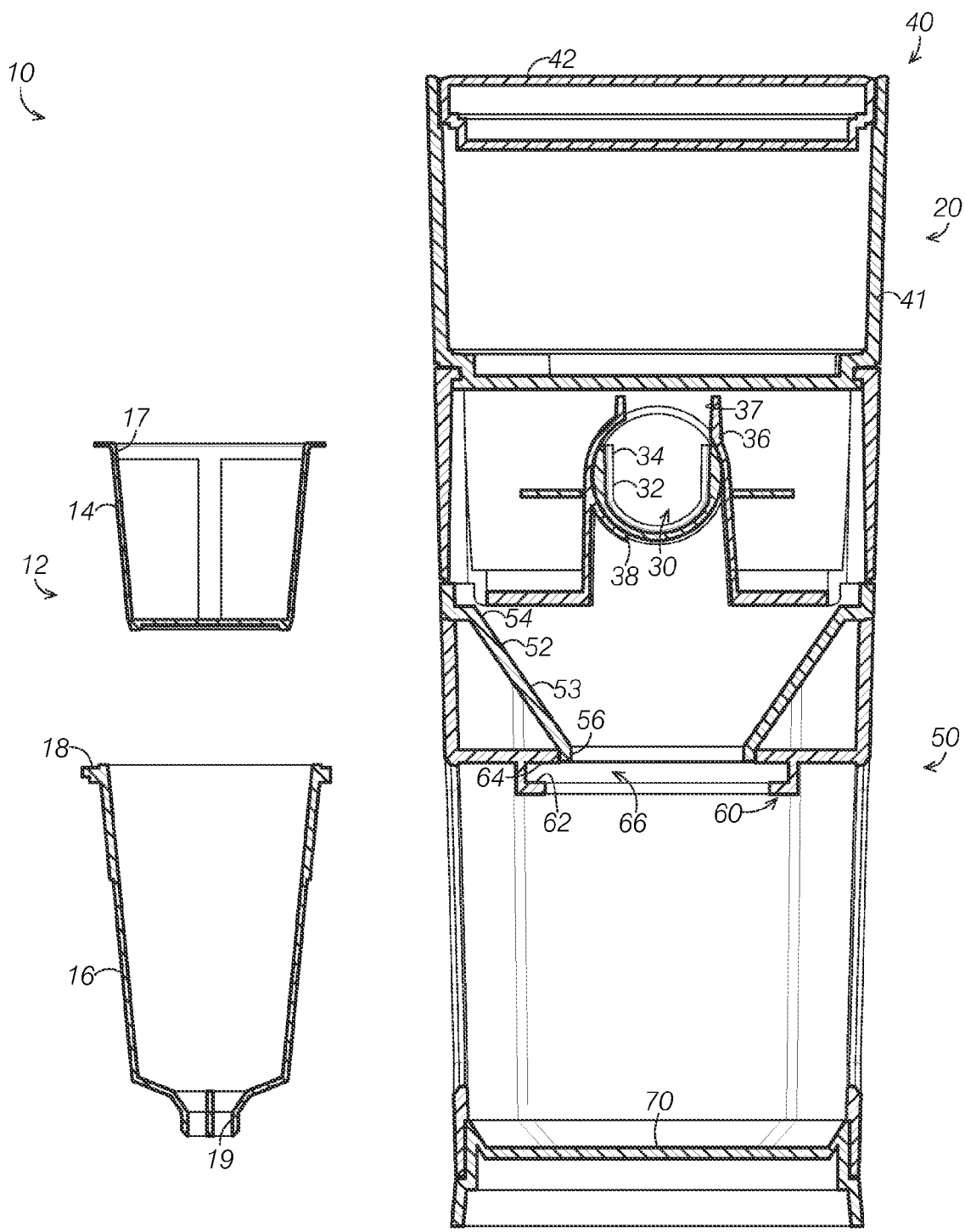
FIG. 7 is a front elevation view of a cross section of the granule dispenser shown in FIG. 1 taken about the line VII-VII in FIG. 1 with the receiving cup adjacent to the granule dispenser.

With reference to FIGS. 4, 5, and 7, the reader can see that dispenser 20 includes a collector 30 and an optional hopper 40 mounted above collector 30 to store granules. The dispenser may define separate compartments, one compartment for the hopper and another compartment for the collector. Alternatively, the dispenser may form a single, unitary compartment in which both the hopper and the collector are located.

In some examples, the hopper is configured to selectively detach from the collector. Dispenser 20 is mounted above base 50, which allows dispenser 20 to make use of gravity when dispensing granules. Dispenser 20 stores granules in hopper 40, collects a predetermined volume of granules in collector 30, and dispenses the predetermined volume of granules to base 50.

As shown in FIGS. 4, 5, 7 and 8, collector 30 defines a collector cavity 32 and a port 34 providing access to the collector cavity. In the example shown in FIGS. 1-8, collector cavity 32 defines a dispensing volume substantially equal to the predetermined volume of granules. In the example shown in FIGS. 1-8, the dispensing volume defined by collector cavity 32 is substantially equal to a single serving of granules.

The reader should understand that in some examples, the collector cavity defines a dispensing volume that is less than or greater than the predetermined volume of granules. For example, the collector cavity may define a volume equal to one-half the predetermined volume of granules, and the collector may therefore receive the predetermined volume of granules in two stages: first the collector receives one-half the predetermined volume of granules and dispenses the first half of granules, and second, the collector receives the second-half of the predetermined volume. Likewise, the dispensing volume may be equal to, greater than, or less than a single serving of granules.

Figure 8:
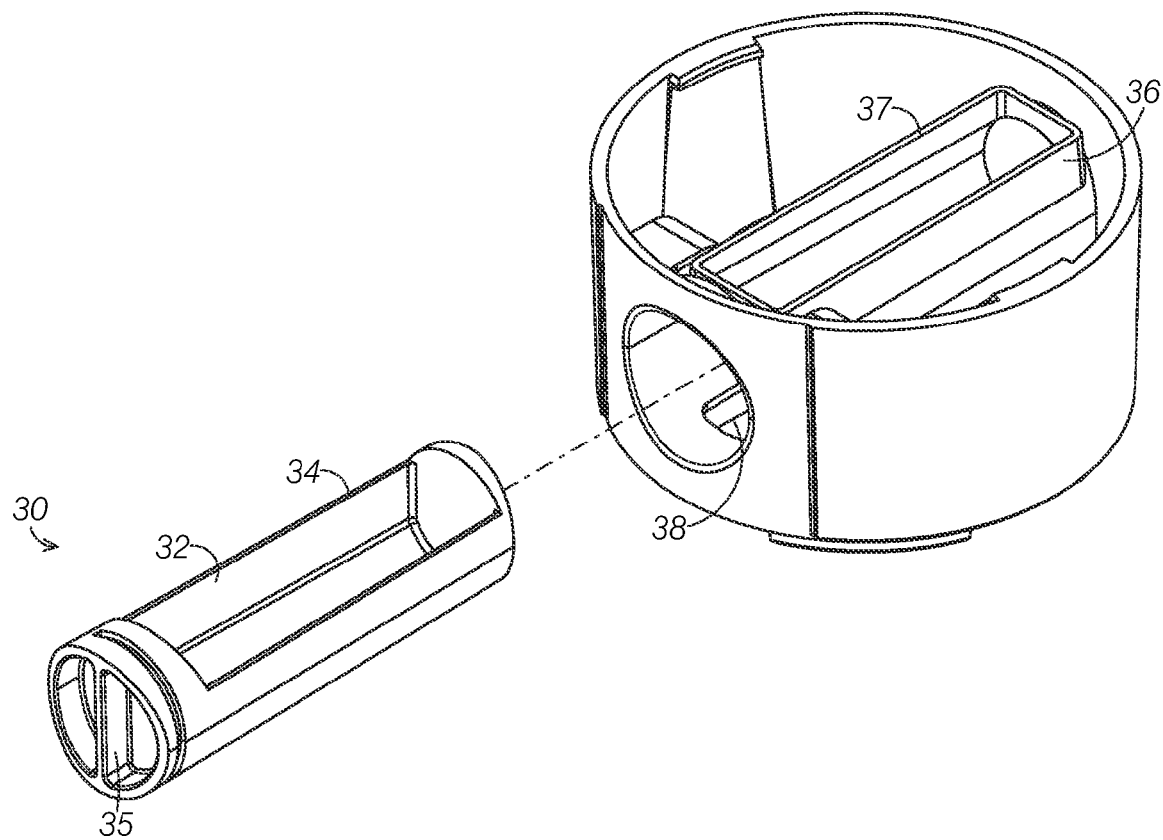
FIG. 8 is an exploded perspective view of a collector and a bearing.

In the present example, and perhaps most clearly shown in FIG. 8, collector 30 is elongate and is approximately in the shape of a cylinder. A cylinder is one of many suitable shapes for the collector. Other suitable shapes for the collector include shapes that are generally cubic, rectangular, triangular, oval or irregular.

Figure 6:
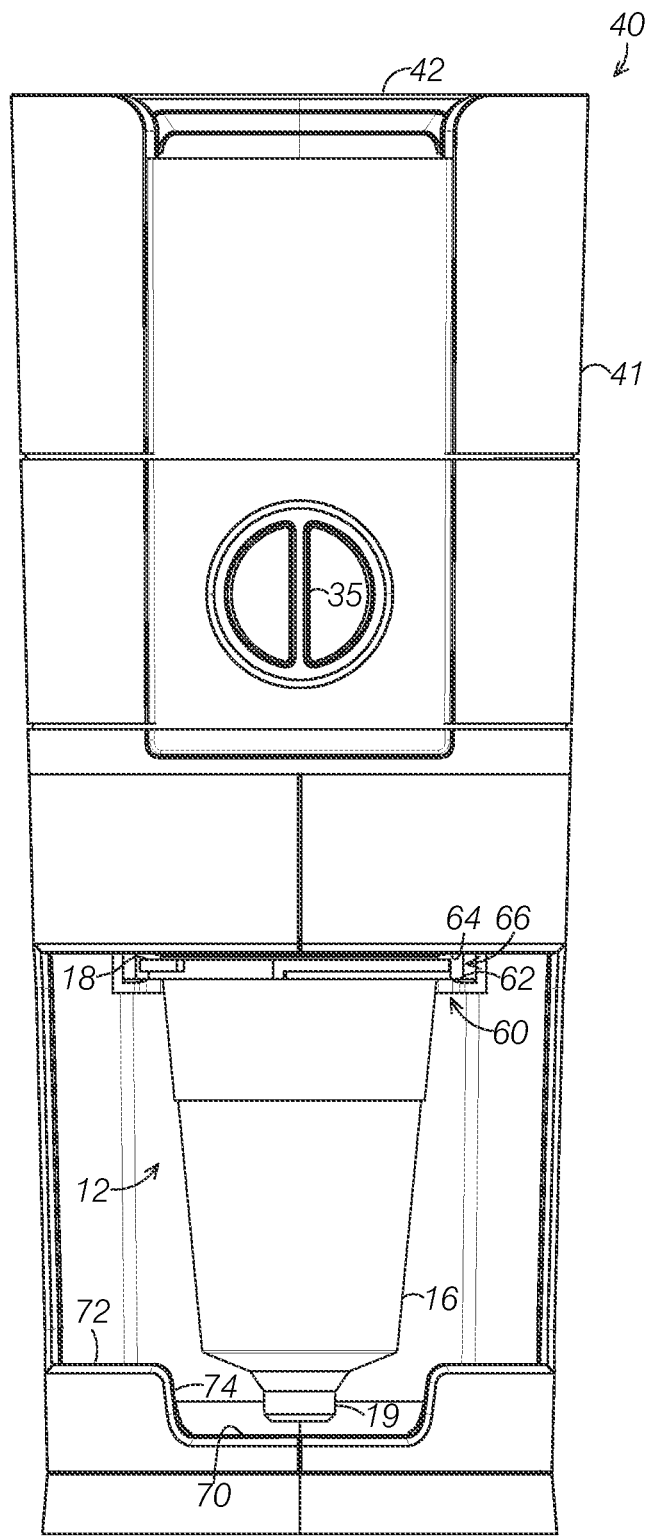
FIG. 6 a front elevation view of the granule dispenser shown in FIG. 1 with the receiving cup mounted on the granule dispenser.

In the example shown in FIGS. 1-8, collector 30 is rotatably mounted within the dispenser and is configured to rotate 360 degrees about its longitudinal axis. In other examples, the collector is configured to rotate less than 360 degrees, such as by including stops that restrict the collector from rotating beyond a desired angle, for example beyond 180 degrees. Biasing mechanisms, such as springs, elastic members, and resilient members, may be included to bias the collector back to a desired position after being rotated. As shown in FIGS. 1, 6, and 8, collector 30 includes a knob 35 with which a user may rotate collector 30.

To facilitate collector 30 rotating within dispenser 20, dispenser 20 includes a bearing 36 inside which collector 30 is mounted. Bearing 36 is cylindrical and defines a top opening 37 and a bottom opening 38. Granules my pass into collector 30 through top opening 37 and out of collector 30 through bottom opening 38 depending on the relative position of port 34 to the top and bottom openings of bearing 36.

As shown most clearly in FIG. 8, port 34 extends substantially the entire length of collector 30. In other examples, the port extends less than the entire length of the collector. Indeed, in some examples the port defines a relatively small opening. Any size and shape of port suitable for receiving granules into the collector cavity may be used.

Collector 30 is configured to rotate between a receiving position where port 34 is positioned to receive granules and a dispensing position where port 34 is positioned above base 50 to dispense granules to base 50. In the example shown in FIGS. 1-8, which makes beneficial use of gravity to move granules, port 34 is positioned below hopper 40 in the receiving position to receive granules from hopper 40. Moreover, in the example shown in FIGS. 1-8, port 34 underlies top opening 37 in the receiving position and port 34 overlies bottom opening 38 in the dispensing position.

The relative orientation of port 34 to the other components of granule dispenser 10, especially the vertical orientation or lack thereof, may be different in examples beyond the example shown in FIGS. 1-8. For instance, in some examples the granule dispenser includes components to mechanically move granules from one component to another rather than relying in whole or in part on gravity to transfer granules through the dispenser. In such examples, the port is partially or fully horizontal relative to other components in the receiving and/or dispensing positions.

As shown in FIGS. 4, 5, and 7, hopper 40 includes a body 41 defining a hopper cavity that has a larger volume than the dispensing volume defined by collector cavity 32. While hopper 40 is optional, it may be advantageous in applications where a user desires to load and store in advance a relatively large quantity of granules to conveniently have ready to dispense later. For example, hopper 40 may store five, ten, twenty or more servings or more of granules, which allows the user to dispense multiple servings of granules before needing to reload granule dispenser 10 with granules. Reducing the instances when granules are transferred to the granule dispenser may reduce the risk of a mess being created in the form of spilled granules.

To facilitate transferring granules to hopper 40 and storing granules in hopper 40, hopper 40 includes a lid 42 removably mounted to body 41. Lid 42 is removable and substantially seals the hopper cavity. In the example shown in FIGS. 1-8, lid 42 defines the entire roof of hopper 40; however, other examples include a smaller lid or no lid at all. In some examples, the hopper defines or includes a funnel proximate the collector to funnel granules through a relatively narrow pass-through to the port of the collector. In some examples, the pass-through of the funnel is substantially the same size as the port. In other examples, the pass-trough is smaller than the port.

As shown in FIGS. 1-7, base 50 supports dispenser 20 from underneath dispenser 20. Base 50 ma rest on the ground, a table, a counter, or other work surface. With reference to FIGS. 4, 5, and 7, base 50 includes a chute 52 mounted beneath collector 30 and a support 60 configured to releasably mount receiving cup 12 beneath chute 52 in a position to receive granules from chute 52.

Chute 52 is defined by an outer wall 53 tapering or funneling from a chute inlet 54 to a chute outlet 56. Chute inlet 54 is disposed proximate collector 30 and chute outlet 56 is disposed proximate top opening 17 of receiving cup 12 when receiving cup 12 is mounted to support 60. When collector 30 is in the dispensing position, chute inlet 54 is proximate port 34.

As shown in FIG. 5, chute outlet 56 is approximately equal in size to top opening 17 of receiving cup 12. In the particular example shown in FIGS. 1-7, chute outlet 56 is slightly smaller than top opening 17. The chute outlet is preferably equal to or less than the size of top opening, with chute outlet sizes closer to the size of the top opening increasing the flow rate of granules into the receiving cup.

In other examples, the chute may define outer walls that do not taper, but that extend vertically to define a duct, pipe, or conduit. In still other examples, the chute includes one or more tapered outer walls and one or more non-tapered outer walls. The reader should appreciate that the chute is not required in all examples, but instead the collector may dispense granules into the receiving cup directly.

As shown in FIGS. 2-7, support 60 includes a ledge 62 complimentarily configured with outer lip 18 of receiving cup 12 to support receiving cup 12 from below outer lip 18. In the specific example shown in FIGS. 2-7, ledge 62 extends in a curved path complimenting the curved shape of outer lip 18. However, the ledge does not follow a curved path in all examples, but instead is rectilinear in some examples or composed of spaced, parallel ledges in other examples.

With reference to FIGS. 2-7 base 50 includes a dividing wall 64 between chute 52 and support 60. Dividing wall 64 and support 60 collectively define a groove 66. Groove 66 is complimentarily configured with outer lip 18 to support receiving cup 12 from above and below outer lip 18. Groove 66 shown in FIGS. 2-7 extends in a curved path. However in other examples the groove extends in a rectilinear path and in some examples is composed of spaced, parallel grooves.

As shown in FIGS. 1-7, catch plate 70 includes a horizontal face facing support 60 from below receiving cup 12 when receiving cup 12 is mounted to support 60. Catch plate 70 serves to catch granules that are not transferred to receiving cup 12 or that are otherwise released from dispenser 20. To facilitate retaining granules caught on catch plate 70, base 50 includes a retaining wall 72 extending from catch plate 70 along the periphery of a portion of catch plate 70. To facilitate removing granules caught on catch plate 70, retaining wall 72 defines a wall opening 74 through which granules on catch plate 70 can be removed.

As shown in FIGS. 1-7, catch plate 70 is spaced below ledge 62 a distance greater than the height of receiving cup 12 such that receiving cup 12 hangs freely from support 60 without interacting with catch plate 70 from below in other examples, the catch plate is spaced below the ledge a distance substantially equal to the height of the receiving cup such that the catch plate supports the receiving cup from below when the receiving cup is mounted to the support.

In use, a user loads hopper 40 with granules to later dispense into receiving cup 12. When the user desires to dispense granules into receiving cup 12, the user mounts receiving cup 12 on support 60 and turns knob 35 to rotate collector 30 to the receiving position. When collector 30 is in the receiving position, a predetermined volume of granules will transfer from hopper 40 to collector cavity 32 through port 34 due to the force of gravity. The granules will naturally stop flowing from hopper 40 to collector 30 when collector cavity 32 is full.

When collector cavity 32 is full of granules, the user then turns knob 35 to rotate collector 30 to the dispensing position. In the dispensing position, granules will transfer from collector cavity 32 to chute 52 through port 34 due to the force of gravity. The granules will then be funneled to exit through chute outlet 56 into receiving cup 12.

Optionally, collector 30 can be rotated to the receiving position again to receive additional granules from hopper 40 if a user desires more granules to brew his beverage, i.e., a "stronger" beverage. The reader should note that the user need not transfer all of the granules in collector cavity 32 to chute 52. Indeed, by limiting the time collector 30 is held in the dispensing position, the volume of granules transferred from collector 30 to chute 52 can be controlled.

Once the desired quantity of granules are transferred to receiving cup 12, receiving cup 12 can then be removed from support 60 and taken to a brewing machine to brew a beverage from the granules contained therein. Catch plate 70 will catch a substantial majority of granules, if any, not effectively transferred to receiving cup 12. Granules on catch plate 70 can be swept or poured out of wall opening 74 into a waste basket, a granule storage container, or back into the hopper in examples where the base is configured to detach from the dispenser or the hopper is configured to detach from the collector.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor including two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A granule dispenser for dispensing granules into a receiving cup comprising:
    a dispenser including a collector mounted for rotation within the dispenser and configured to receive a predetermined volume of granules, the collector defining:
        a cavity defining a dispensing volume substantially equal to the predetermined volume of granules, and
        a port providing access to the cavity; and
    a base supporting the dispenser from underneath the dispenser, the base including:
        a chute,
        a support configured to releasably mount the receiving cup beneath the chute in a position to receive the granules from the chute, and
    a catch plate spaced beneath the support in a position below the receiving cup when the receiving cup is mounted to the support to catch the granules that are not transferred to the receiving cup;
    wherein:
        the collector rotates between a receiving position where the port is positioned to receive the granules and a dispensing position where the port is positioned above the chute;
        the collector is configured to rotate 360 degrees;
        the dispenser includes a cylindrical bearing defining a top opening and a bottom opening; and
        the collector is mounted inside the cylindrical bearin and the port underlies the top opening in the receiving position and the port overlies the bottom opening in the dispensing position.

2. The granule dispenser of claim 1, wherein:
    the dispenser further comprises a hopper mounted above the collector to store the granules, and
    the port of the collector is positioned below the hopper in the receiving position to receive the granules from the hopper.

3. The granule dispenser of claim 2, wherein the hopper includes a removable lid.

4. The granule dispenser of claim 1, wherein the collector is cylindrical.

5. The granule dispenser of claim 1, wherein the port extends substantially the entire length of the collector.

6. The granule dispenser of claim 1, wherein the collector includes a knob with which a user may rotate the collector.

7. The granule dispenser of claim 1, wherein the dispensing volume defined by the cavity is selected to receive a single serving of the granules.

8. The granule dispenser of claim 1, wherein the chute defines a chute outlet and the receiving cup defines a top opening, wherein the chute outlet is substantially the same size as the top opening of the receiving cup.

9. The granule dispenser of claim 1, wherein the base includes a retaining wall extending from the catch plate along the periphery of a portion of the catch plate, the retaining wall retaining the granules caught by the catch plate on the catch plate.

10. The granule dispenser of claim 9, wherein the retaining wall defines a wall opening through which the granules on the catch plate can be removed.

11. The granule dispenser of claim 1, wherein the collector is elongate.

12. The granule dispenser of claim 2, wherein the hopper defines a hopper cavity that defines a hopper cavity volume larger than the dispensing volume.

13. The granule dispenser of claim 3, wherein the removable lid defines an entire roof of the hopper.

14. The granule dispenser of claim 3, wherein the hopper includes a hollow body and the lid is removably mounted to the hollow body to allow selective access to the hollow body for adding the granules to the body.

15. The granule dispenser of claim 6, wherein:
    the collector is configured to rotate to the receiving position in response to the knob being turned; and
    the collector is configured to rotate to the dispensing position in response to the knob being turned.

16. The granule dispenser of claim 2, wherein the port is positioned proximate the hopper in the receiving position.

17. A granule dispenser for dispensing granules into a receiving cup, comprising:
    a dispenser including a collector mounted for rotation within the dispenser and configured to receive a predetermined volume of granules, the collector defining:
        a cavity defining a dispensing volume substantially equal the predetermined volume of granules, and
        a port providing access to the cavity; and
    a base supporting the dispenser from underneath the dispenser, the base including:
        a chute,
        a support configured to releasably mount the receiving cup beneath the chute in a position to receive the granules from the chute, and
    a catch plate spaced beneath the support in a position below the receiving cup when the receiving cup is mounted to the support to catch the granules that are not transferred to the receiving cup;
    wherein:

the collector rotates between a receiving position where the port is positioned to receive the granules and a dispensing position where the port is positioned above the chute;

the receiving cup includes an outer lip and the support defines a ledge complimentarily configured with the outer lip to support the receiving cup from below the outer lip.

18. The granule dispenser of claim 17, wherein the, catch plate is spaced below the ledge a distance greater than the height of the receiving cup such that the receiving cup hangs freely from the support without the catch plate interacting with the receiving cup from below.

19. A granule dispenser for dispensing granules into a receiving cup, comprising:
a dispenser including a collector mounted for rotation within the dispenser and configured to receive a predetermined volume of granules, the collector defining:
a cavity defining a dispensing volume substantially equal to the predetermined volume of granules, and
a port providing access to the cavity; and
a base supporting the dispenser from underneath the dispenser, the base including:
a chute,
a support configured to releasably mount the receiving cup beneath the chute in a position to receive the granules from the chute, and
a catch plate spaced beneath the support in a position below the receiving cup when the receiving cup is mounted to the support to catch the granules that are not transferred to the receiving cup;
wherein:
the collector rotates between a receiving position where the port is positioned to receive the granules and a dispensing position where the port is positioned above the chute;
the receiving cup includes an outer lip;
the base further comprises a dividing wall between the chute and the support; and
the dividing wall and the support collectively define a groove complimentarily configured with the outer lip to support the receiving cup from above and below the outer lip.

20. The granule dispenser of claim 19, wherein the groove extends along a curved path.

\* \* \* \* \*